April 19, 1966   H. C. LAUB, JR   3,246,803
PERFORATED BAG FOR USE AS A DISPENSING UNIT
Filed April 9, 1963
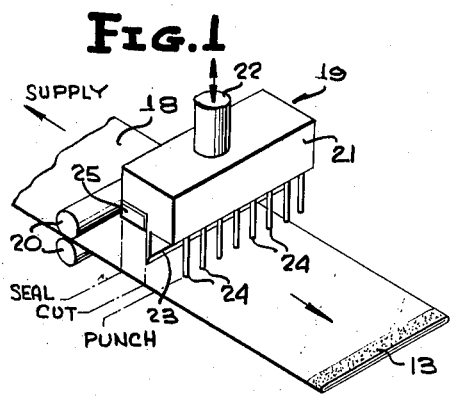
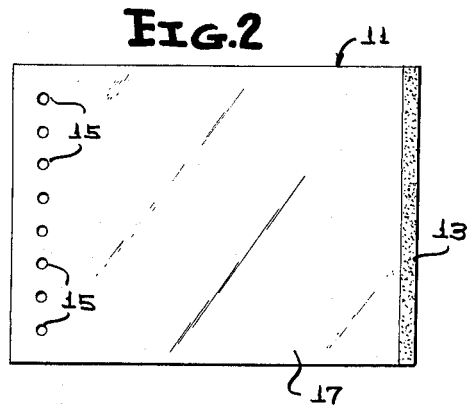
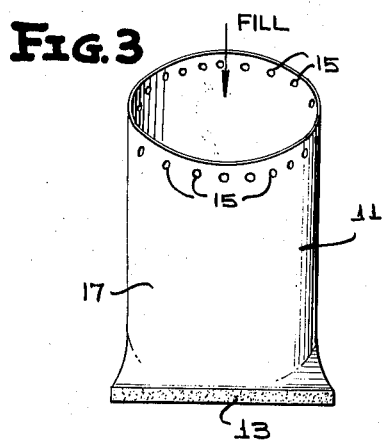
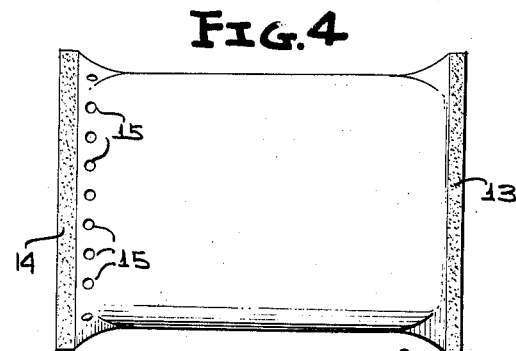
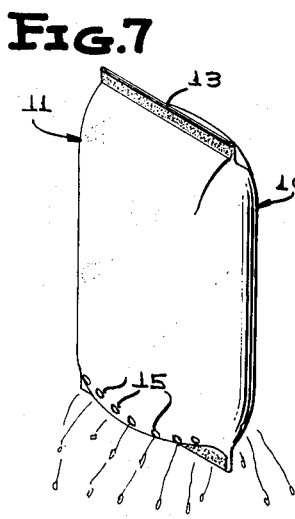
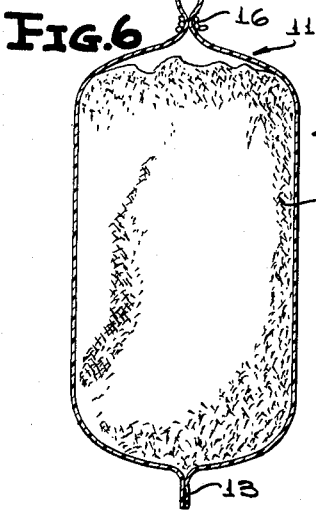
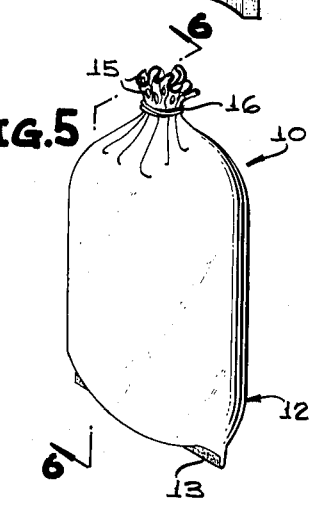
INVENTOR
HENRY C. LAUB, JR.
BY
Mason, Porter, Diller & Stewart
ATTORNEYS

United States Patent Office 3,246,803
Patented Apr. 19, 1966

3,246,803
PERFORATED BAG FOR USE AS A DISPENSING UNIT
Henry C. Laub, Jr., Omaha, Nebr., assignor to Continental Can Company, Inc., New York, N.Y., a corporation of New York
Filed Apr. 9, 1963, Ser. No. 271,684
5 Claims. (Cl. 222—107)

This invention relates in general to new and useful improvements in containers, and more specifically relates to a novel container which is suitable for serving the dual purpose of storing a flowable product which is to be dispensed and effecting the regulated dispensing thereof.

There are many products which are shipped in bags and other similar containers which are distributed as opposed to being utilized in bulk. A typical example of such a product is grass seed. There are numerous other products, including fertilizer, other chemicals, etc. Accordingly, it is the primary object of this invention to provide a novel container which is suitable for the shipment and storing of a flowable product, and which, when desired, may be utilized for the purpose of dispensing the product over a large area.

Another object of this invention is to provide a novel package which includes a bag in the form of an elongated tube closed at both ends, the bag containing a flowable product to be dispensed and having adjacent one closed end thereof a plurality of dispensing openings through which the product may flow in a spray-like manner, and the bag being temporarily sealed for shipment and storage by means of a tie therearound adjacent the dispensing openings remote from the one end whereby flow of the product within the bag out through the dispensing openings is normally prevented, but is readily accomplished by removing the tie and inverting the bag.

Another object of this invention is to provide a novel bag which is provided with a plurality of dispensing openings through which a flowable material may be dispensed in a spray-like manner, the bag having a closed end and an open end with the dispensing openings being disposed immediately adjacent the open end whereby the bag may be readily filled through the open end without the loss of the product being packaged through the dispensing openings.

A further object of this invention is to provide a novel method of forming a bag of the dispensing type wherein the bag is provided with a closed end, an open end and a plurality of dispensing openings adjacent the open end, the method including the steps of providing a continuous tube, and then simultaneously cutting from the tube a predetermined length, punching in the cut-off length of tube a plurality of dispensing openings adjacent the line of cut-off, and sealing the then new end of the tube immediately adjacent the line of cut-off.

A still further object of this invention is to provide a novel bag which may be readily used for the purpose of shipping and storing a flowable material and is at the same time of a construction wherein it may be used for the purpose of dispensing a product contained therein in a spray-like manner, the bag being of an extremely simple construction whereby it may be quickly and readily formed, it may be easily filled and closed, and may be easily utilized, the bag also being of a construction wherein the cost of manufacture thereof is a minimum so that the bag is economically feasible.

With the above and other objects in view that will hereinafter appear, the nature of the invention will be more clearly understood by reference to the following detailed description, the appended claims and the several views illustrated in the accompanying drawing.

In the drawing:

FIGURE 1 is a schematic perspective view showing the manner in which bags in accordance with this invention are formed.

FIGURE 2 is a plan view of a newly formed bag in accordance with this invention, the view being on an enlarged scale.

FIGURE 3 is a perspective view showing the bag opened ready to receive a fill.

FIGURE 4 is an enlarged plan view showing the bag filled.

FIGURE 5 is a perspective view showing the filled bag with the tie therearound sealing off the contents of the bag from the dispensing openings therein.

FIGURE 6 is an enlarged vertical sectional view taken along the line 6—6 of FIGURE 5 and shows the specific construction of the filled bag with the product disposed therein.

FIGURE 7 is a perspecetive view showing the bag with the tie removed and the bag in an inverted product dispensing position.

Referring now to the drawing in detail, it will be seen that there is illustrated in FIGURES 5, 6 and 7 a package formed in accordance with this invention, the package being generally referred to by the numeral 10. The package 10 is formed of a bag 11 in which there is disposed a flowable product 12. The bag 11 is in the form of a tube which is permanently sealed at opposite ends thereof, the bag 11 having a bottom heat-seal 13 and a top heat-seal 14. The bag tube is provided immediately adjacent the top heat-seal 14 with a plurality of dispensing openings 15. The dispensing openings 15 are preferably of a small diameter in accordance with the specific product 12 and are equally spaced around the periphery of the bag tube, as is best shown in FIGURE 3.

The bag 11 is closed against loss of the product 12 from therewithin during shipment and storage by means of a suitable tie 16 which may be of any type, but which is preferably of a conventional plastic strip type which may be readily secured and released. The tie 16 isolates the dispensing openings 15 from the product 12 within the bag 11. The package 10, as is clearly shown in FIGURES 5 and 6, is suitable for the shipment and storage of the product 12 disposed within the bag 11 without loss of the product.

When it is desired to dispense the product 12 in a spray-like operation, it is merely necessary to remove the tie 15 and invert the package 10, as is shown in FIGURE 7. It will be readily apparent from FIGURE 7 that it is merely necessary to hold the package 10 in the illustrated inverted position and to lightly shake the package for the product 12 to be dispensed therefrom. Due to the bulging of the bag in the area of the dispensing openings 15, the product flows through the dispensing openings in a spray-like pattern. This is highly desirable for the dispensing of products such as grass seeds, chemicals, etc.

Referring now to FIGURE 2 in particular, it will be seen that the bag 11 is initially provided in a flat state with the bag tube, which is referred to by the numeral 17, being flat. One end of the bag tube 17 is sealed by means of the heat seal 13 described above. The dispensing openings 15 are formed in the bag tube 17 adjacent to, but spaced from, the opposite end thereof. The bag tube 17 is preferably formed of an inexpensive plastic material, although other materials may be utilized, including plain paper, plastic paper laminates, etc. At this time it is also pointed out that the bag tube 17 need not be of an integral construction, in that the bag tube 17 may be provided with a longitudinal seam if the bag tube is formed by a folding and sealing operation.

When it is desired to fill the bag 11, the end thereof remote from the bottom heat-seal 13 is opened, as is shown in FIGURE 3. The bag 11 is then filled in the conventional manner. It is to be understood that since the dispensing openings 15 are disposed adjacent the open mouth of the bag 11, there will be no escaping of the product 12 through the dispensing openings 15 during the filling operation. After the filling of the bag 11 has been accomplished, the upper end of the bag 11 is closed by top seal 14 to prevent the escape of the product 12 from within the bag 11 except through the dispensing openings 15. The package 10 is then completed by a wrapping of the tie 16 around the upper portion of the bag tube 17 below the dispensing openings 15 to isolate the dispensing openings 15 from the product 12 in the manner best shown in FIGURE 6.

The bag 11 may be quickly and economically formed in a manner shown in FIGURE 1. A continuous tube 18 is formed in any desired manner and is either directly fed after forming or fed from a roll to an apparatus, generally referred to by the numeral 19. The tube 18, which is flattened, is fed by a pair of feed rolls 20 on a continuous basis beneath the apparatus 19.

The apparatus 19 includes a vertically reciprocating head 21 carried by a vertically reciprocating shaft 22. The head is provided with a centrally located knife 23 which serves to sever a length of the tube 18 from the remainder thereof in accordance with the desired length of the bag 11.

The head 21 also carries a plurality of punches 24 which are disposed adjacent to, but spaced from, the knife 23 so as to punch the dispensing openings 15 in the cut-off section of the tube 18 at a predetermined distance from the end of the cut-off section of the tube. It is to be noted that the punches 24 pass through both layers of the tube and thus each punch 24 simultaneously forms two openings 15 in the cut-off section of the tube.

The head 21 also is provided with a heat sealing element 25 which is disposed immediately adjacent the knife 23 and remote from the punches 24. The heat sealing element 25 serves to heat seal the then remaining end of the tube 18 so as to provide eventually what is the bottom seal 13 of the bag 11.

It will be readily apparent that since the punches of the heat sealing element 25 are fixed to the knife 23, the relationship of the dispensing openings 15 with respect to the open end of the bag 11 and the relationship of the bottom heat seal 13 with respect to the opposite end of the bag 11 remain constant.

From the foregoing it will be readily apparent that the bag 11 may be formed on a continuous basis in a single step operation wherein a plurality of necessary operations are simultaneously accomplished. Accordingly, the mode of manufacturing the bags is of a nature wherein the bags are economically feasible.

Although only a preferred embodiment of the invention has been specifically described and illustrated herein, it is to be understood that minor modifications may be made therein in accordance with the spirit and scope of the invention.

I claim:
1. A package comprising a bag in the general form of a tube closed at both ends, a plurality of dispensing openings in said bag adjacent one of said ends, a flowable product disposed within said bag for dispensing through said dispensing openings, and temporary bag closing means closing off said bag adjacent said dispensing openings at the side thereof remote from said one end to normally prevent escape of said product through said dispensing openings.

2. A package comprising a bag in the general form of a tube closed at both ends, a plurality of dispensing openings in said bag adjacent one of said ends, a flowable product disposed within said bag for dispensing through said dispensing openings, and a removable tie closing off said bag adjacent said dispensing openings at the side thereof remote from said one end to normally prevent escape of said product through said dispensing openings.

3. The package of claim 1 wherein said tube is formed of a plastic material and said ends are permanently closed by heat sealing.

4. A bag particularly adapted for storing and dispensing a product, said bag comprising a tube having a closed end and an open end, and a plurality of dispensing openings extending around said tube closely adjacent said open end with sufficient space being left for closing said open end beyond said dispensing openings.

5. The bag of claim 4 wherein said dispensing openings are disposed in uniformly spaced relation entirely around said tube.

References Cited by the Examiner

UNITED STATES PATENTS

| | | | |
|---|---|---|---|
| 1,123,010 | 12/1914 | Richardson | 222—107 X |
| 1,686,166 | 10/1928 | Muller. | |
| 2,103,389 | 12/1937 | Salfisberg | 222—107 |
| 2,325,942 | 8/1943 | Drake | 222—107 |
| 2,371,521 | 3/1945 | Heywood et al. | 222—107 |
| 2,517,027 | 8/1950 | Rado | 222—107 X |
| 2,707,581 | 5/1955 | Kaplan et al. | 222—107 |
| 2,775,082 | 12/1956 | Vogt | 53—37 |
| 2,864,108 | 12/1958 | Johnson | 222—107 X |
| 3,046,827 | 7/1962 | Voege et al. | 93—35 |
| 3,083,876 | 4/1963 | Schneider et al. | 222—107 |
| 3,159,096 | 12/1964 | Tocker. | |

FOREIGN PATENTS 713,176   8/1931   France.

RAPHAEL M. LUPO, *Primary Examiner.*